United States Patent
Kawai (10) Patent No.: US 10,462,311 B2
(45) Date of Patent: Oct. 29, 2019

(54) COMMUNICATION APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Yuji Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/895,561

(22) Filed: Feb. 13, 2018

(65) Prior Publication Data

US 2018/0241891 A1 Aug. 23, 2018

(30) Foreign Application Priority Data

Feb. 20, 2017 (JP) ................. 2017-029231

(51) Int. Cl.
*H04N 1/00* (2006.01)
*H04L 29/08* (2006.01)
*H04L 29/06* (2006.01)

(52) U.S. Cl.
CPC ......... *H04N 1/00228* (2013.01); *H04L 63/10* (2013.01); *H04L 67/06* (2013.01);
(Continued)

(58) Field of Classification Search
CPC ............. G06F 11/1451; G06F 11/2028; G06F 11/2071; G06F 3/0482; H04N 1/00244; H04N 1/00973; H04N 1/32085; H04N 1/32096; H04N 1/32117; H04N 1/324; H04N 1/32416; H04N 1/32614; H04N 1/32641; H04N 1/32651; H04N 1/32694; H04N 2201/0039; H04N 2201/0094; H04N 2201/3207; H04N 2201/3208; H04N 2201/3209; H04N 2201/3274; H04N 2201/3278
(Continued)

(56) References Cited

U.S. PATENT DOCUMENTS 6,829,181 B1 * 12/2004 Seitoh .................... G11C 29/38
365/201
9,335,732 B2 * 5/2016 Nishi .................. G03G 15/5004
(Continued)

FOREIGN PATENT DOCUMENTS

JP 2011-120279 A 6/2011

*Primary Examiner* — Negussie Worku
(74) *Attorney, Agent, or Firm* — Cowan, Liebowitz & Latman, P.C.

(57) ABSTRACT

There is provided a communication apparatus. A communication control controls a communication unit so as to connect to one of a plurality of external apparatuses. A transfer unit transfers a data item to an external apparatus to which the communication unit has connected. In a case that a transfer of the data item is failed, a storage control unit stores transfer failure information in which the data item is associated with a transfer-destination external apparatus. In a case that the communication unit has connected to a first external apparatus, a transfer control unit controls a transfer of a data item. If a data item included in the transfer failure information is associated with the first external apparatus, the transfer control unit performs control so as to automatically transfer the data item to the first external apparatus.

13 Claims, 7 Drawing Sheets

(52) U.S. Cl.
CPC ..... *H04N 1/00217* (2013.01); *H04N 1/00244* (2013.01); *H04L 67/02* (2013.01)

(58) Field of Classification Search
USPC .................................................. 358/1.15, 442
See application file for complete search history.

(56) References Cited

U.S. PATENT DOCUMENTS

| | | | |
|---|---|---|---|
| 9,459,565 B2* | 10/2016 | Ohmura | G03G 15/1675 |
| 9,494,889 B2* | 11/2016 | Tsuchiya | G03G 15/043 |
| 2005/0160305 A1* | 7/2005 | Soejima | G06F 11/2028 |
| | | | 714/2 |
| 2009/0311964 A1* | 12/2009 | Yamamoto | H04W 16/14 |
| | | | 455/63.3 |
| 2012/0079064 A1* | 3/2012 | Fukushima | H04N 1/00244 |
| | | | 709/217 |
| 2016/0063036 A1* | 3/2016 | Kawai | G06F 17/30268 |
| | | | 345/173 |
| 2016/0253651 A1* | 9/2016 | Park | G06F 3/0482 |
| | | | 705/39 |
| 2018/0241939 A1* | 8/2018 | Kawai | H04N 5/23225 |
| 2018/0324075 A1* | 11/2018 | Kawai | H04L 43/103 |

* cited by examiner

| | SET1 | SET2 | SET3 | SET4 | SET5 | SET6 | ... | SET20 |
|---|---|---|---|---|---|---|---|---|
| COMMUNICATION MODE | FTP TRANSFER | PC TRANSFER | FTP TRANSFER | FTP TRANSFER | Smartphone | FTP TRANSFER | | |
| TYPE OF LAN | WIRELESS | WIRELESS | WIRELESS | WIRED | WIRELESS | WIRELESS | | |
| SSID | AP1 | AP2 | AP2 | - | myAP | AP1 | | |
| AUTHENTICATION METHOD | WPA2 | WPA2 | WPA2 | - | WPA2 | WPA2 | | |
| TYPE OF ENCRYPTION | AES | AES | AES | - | AES | AES | | |
| ENCRYPTION KEY | abcdefgh | 12345678 | 12345678 | - | 87654321 | abcdefgh | | |
| CHANNEL | 1 | 6 | 6 | - | 3 | 1 | | |
| IP ADDRESS ACQUISITION | AUTOMATIC | MANUAL | MANUAL | AUTOMATIC | AUTOMATIC | AUTOMATIC | | |
| FTP SERVER | FTP1 | - | FTP2 | FTP1 | - | FTP3 | | |

| TRANSFER-FAILED IMAGE | FTP SERVER WHEN FAILED |
| --- | --- |
| 010.jpg | FTP1 |
| 011.jpg | FTP1 |
| 012.jpg | FTP1 |
| 021.jpg | FTP1 |
| 022.jpg | FTP1 |
| 023.jpg | FTP1 |
| 024.jpg | FTP1 |

FIG. 5B

| TRANSFER-FAILED IMAGE | FTP SERVER WHEN FAILED |
| --- | --- |
| 010.jpg | FTP1 |
| 011.jpg | FTP1 |
| 012.jpg | FTP1 |
| 021.jpg | FTP2 |
| 022.jpg | FTP2 |
| 023.jpg | FTP2, FTP3 |
| 024.jpg | FTP3 |

FIG. 7

COMMUNICATION APPARATUS, IMAGE CAPTURING APPARATUS, CONTROL METHOD, AND STORAGE MEDIUM

BACKGROUND OF THE INVENTION

Field of the Invention

The present invention relates to a communication apparatus, an image capturing apparatus, a control method, and a storage medium.

Description of the Related Art

As a result of the recent high integration of wireless communication devices, wireless LAN is beginning to be installed not only in mobile personal computers (so-called notebook PC), but also in printers, mobile information terminals, digital cameras, smart devices, smartphones, and the like. Accordingly, devices that used to have only a communication function with a specific device through wired connection such as USB connection now have a wireless communication function, and as a result, the devices can perform data communication with various devices. For example, an electronic camera that selects one of a server, a PC, and a printer, and transfers an image to the selected apparatus is disclosed in Japanese Patent Laid-Open No. 2011-120279.

It is also possible for a digital camera to connect to a FTP server, a user selects images that have been shot using the digital camera, and the selected images are transferred to the FTP server. There is a mechanism in which, when an image-transfer has failed, re-transfer of the images is automatically performed. For example, if there is an image that could not be transferred due to a reason such as the wireless connection being cut off during FTP transfer, the digital camera automatically re-transfers the un-transferred image when the digital camera is again connected to the FTP server.

However, the FTP server to which the digital camera is connected after the image transfer failure is not necessarily the same FTP server to which the digital camera was connected when the image transfer failure occurred. Therefore, the known automated re-transfer mechanism has a problem in that the digital camera may automatically transfer an image to an FTP server unintended by the user. The problem occurs not only in a case where a digital camera transfers an image to an FTP server, but a similar problem may occur when a communication apparatus transfers a data item to an external apparatus. Also, the communication method for transfer is not limited to wireless communication, and a similar problem may occur in the case of wired communication.

SUMMARY OF THE INVENTION

The present invention has been made in view of the above-mentioned circumstances, and provide a technique in which a data item that failed to be transferred to an external apparatus can be easily transferred to an external apparatus that is highly likely the one intended by a user.

According to a first aspect of the present invention, there is provided a communication apparatus comprising: a communication control unit configured to control a communication unit so as to connect to one of a plurality of external apparatuses; a transfer unit configured to transfer a data item to an external apparatus to which the communication unit has connected; a storage control unit configured to, in a case that a transfer of the data item is failed, store transfer failure information in which the data item is associated with a transfer-destination external apparatus, in a storage unit; and a transfer control unit configured to control, in a case that the communication unit has connected to a first external apparatus, a transfer of a data item included in the transfer failure information, wherein the transfer control unit performs control so as to, if a data item included in the transfer failure information is associated with the first external apparatus, automatically transfer the data item to the first external apparatus.

According to a second aspect of the present invention, there is provided a control method executed by a communication apparatus, comprising: controlling a communication unit so as to connect to one of a plurality of external apparatuses; transferring a data item to an external apparatus to which the communication unit has connected; in a case that a transfer of the data item is failed, storing transfer failure information in which the data item is associated with a transfer-destination external apparatus, in a storage unit; and in a case that the communication unit has connected to a first external apparatus, controlling a transfer of a data item included in the transfer failure information, wherein if a data item included in the transfer failure information is associated with the first external apparatus, the data item is automatically transferred to the first external apparatus.

According to a third aspect of the present invention, there is provided a non-transitory computer-readable storage medium which stores a program for causing a computer to execute a control method comprising: controlling a communication unit so as to connect to one of a plurality of external apparatuses; transferring a data item to an external apparatus to which the communication unit has connected; in a case that a transfer of the data item is failed, storing transfer failure information in which the data item is associated with a transfer-destination external apparatus, in a storage unit; and in a case that the communication unit has connected to a first external apparatus, controlling a transfer of a data item included in the transfer failure information, wherein if a data item included in the transfer failure information is associated with the first external apparatus, the data item is automatically transferred to the first external apparatus.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Internal Configuration of Digital Camera 100

Figure 1A:
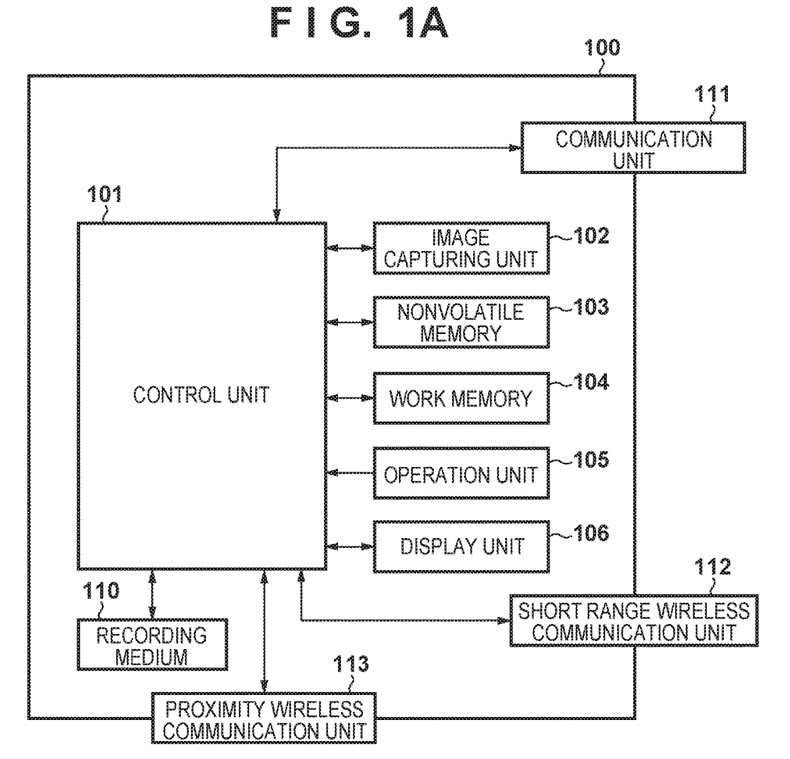
FIG. 1A is a block diagram illustrating a configuration of a digital camera 100, which is an example of a communication apparatus.

FIG. 1A is a block diagram illustrating a configuration of a digital camera 100, which is an example of a communication apparatus. Note that, here, the digital camera will be described as an example of the communication apparatus, but the communication apparatus is not limited thereto. For example, the communication apparatus may be a mobile media player or a so-called information processing apparatus such as a tablet device or a personal computer.

A control unit 101 controls the units of the digital camera 100 according to an input signal and a later-described program. Note that, instead of the control unit 101 controlling the entire apparatus, the entire apparatus may be controlled by a plurality of hardware items sharing processing.

An image capturing unit 102 is constituted by an optical system that can control a diaphragm, zooming, and focusing, and an image sensor that converts light that has been introduced via the optical system to an electric video signal, and the like, for example. A CMOS (Complementary Metal Oxide Semiconductor) or a CCD (Charge Coupled Device) is used, in general, as the image sensor. The image capturing unit 102, under the control of the control unit 101, converts object light with which an image is formed by a lens included in the image capturing unit 102 to an electric signal using the image sensor, performs noise reduction processing and the like, and outputs digital data as the image data. In the digital camera 100 of the present embodiment, the image data is recorded in a recording medium 110 according to the DCF (Design Rule for Camera File system) standard.

A nonvolatile memory 103 is an electrically erasable and recordable nonvolatile memory, and stores a program that is executed by the control unit 101 and the like. A work memory 104 is used as a buffer memory for temporarily storing data of an image captured by the image capturing unit 102, an image display memory for a display unit 106, a work area for the control unit 101, and the like.

An operation unit 105 is used to accept an instruction made by a user to the digital camera 100. The operation unit 105 includes a power button for the user to instruct power on/off of the digital camera 100, a release switch for making a shooting instruction, and a playback button for making an instruction to play back image data. The operation unit 105 further includes operation members such as a dedicated connection button for starting communication with an external apparatus via a later-described communication unit 111. Also, a touch panel formed in the later-described display unit 106 is included in the operation unit 105. Note that the release switch includes an SW1 and an SW2. When the release switch enters a so-called half-pressed state, the SW1 is turned on. Accordingly, an instruction for performing a shooting preparation such as AF (autofocus) processing, AE (auto-exposure) processing, AWB (automatic white balance) processing, and EF (pre-flashing) processing is accepted. Also, as a result of the release switch entering a so-called full-pressed state, the SW2 is turned on. Accordingly, an instruction for performing shooting is accepted.

The display unit 106 displays a view finder image when shooting, displays shot image data, and displays text characters for interactive operation. The display unit 106 need not be incorporated in the digital camera 100. The digital camera 100 needs to be able to connect to an internal or external display unit 106, and only to include at least a display control function for controlling display of the display unit 106.

The recording medium 110 can store image data that has been output from the image capturing unit 102. The recording medium 110 may be configured to be attached to and detached from the digital camera 100, or may be incorporated in the digital camera 100. In other words, the digital camera 100 needs only to include at least a function for accessing the recording medium 110.

A communication unit 111 is an interface for connecting to an external apparatus. The communication unit 111 has various communication functions such as USB, IEEE1394, P1284, SCSI, modem, LAN, RS232C, and wireless communication. A connector (in the case of wired communication) or an antenna (in the case of wireless communication) can be connected to the communication unit 111 in order to connect the digital camera 100 to an external apparatus. The digital camera 100 of the present embodiment can exchange data with the external apparatus via the communication unit 111. For example, the digital camera 100 can transmit image data (data item) generated in the image capturing unit 102 to the external apparatus via the communication unit 111. In the present embodiment, the communication unit 111 includes an interface for performing communication with the external apparatus using a so-called wireless LAN that conforms to the IEEE 802.11 standard.

Note that the communication unit 111 need not be incorporated in the digital camera 100. The digital camera 100 needs to be able to connect to an internal or external communication unit 111, and needs to include at least a communication control function for controlling the communication unit 111. The control unit 101 realizes wireless communication with the external apparatus by controlling the communication unit 111. Note that the communication method is not limited to the wireless LAN, and includes an infrared communication method, for example. Also, in the present embodiment, the communication unit 111 includes an interface for performing communication with the external apparatus using a wired LAN as well.

A short range wireless communication unit 112 is constituted by an antenna for wireless communication, a modulation/demodulation circuit for processing a wireless signal, and a communication controller, for example. The short range wireless communication unit 112 realizes short range wireless communication with an external apparatus in conformity with the IEEE802.15 standard (so-called Bluetooth (registered trademark)) by outputting a modulated wireless signal from the antenna and demodulating a wireless signal received by the antenna. In the present embodiment, the Bluetooth (registered trademark) communication employs Bluetooth (registered trademark) Low Energy version 4.0, which is a low power consumption version. This Bluetooth (registered trademark) communication has a narrower communicable range than the wireless LAN communication (that is, the communicable distance is shorter). Also, the Bluetooth (registered trademark) communication has slower communication speed than the wireless LAN communication. On the other hand, the Bluetooth (registered trademark) communication consumes less power than the wireless LAN communication. The digital camera 100 of the present embodiment can exchange data with the external apparatus via the short range wireless communication unit 112. For example, the digital camera 100, in the case of receiving a shooting instruction from the external apparatus, controls the image capturing unit 102 so as to perform a shooting operation, and in the case of receiving an instruction to exchange data using wireless LAN communication, controls the communication unit 111 so as to start the wireless LAN communication.

A proximity wireless communication unit 113 is constituted by an antenna for wireless communication, a modulation/demodulation circuit, and a communication controller for processing a wireless signal, for example. The proximity wireless communication unit 113 outputs a modulated wireless signal from the antenna, and demodulates a wireless signal received by the antenna. Accordingly, the proximity wireless communication unit 113 realizes contactless proximity communication that conforms to the ISO/IEC 18092 standard (so-called NFC: Near Field Communication). The proximity wireless communication unit 113 of the present embodiment is arranged at a side portion of the digital camera 100.

The digital camera 100 and a smart device (unshown) start communication and are connected when the proximity wireless communication units of the respective devices are brought close to each other. Note that, when the devices are connected using the proximity wireless communication units, the proximity wireless communication units need not be brought into contact with each other. Because the proximity wireless communication units can communicate even if they are separated from each other by a certain distance, it is sufficient that the units are brought into a proximity wireless communicable range so as to connect the devices to each other. In the following description, "being brought into the proximity wireless communicable range" will be also referred to as "being brought close".

Also, when the proximity wireless communication units are at a distance at which the proximity wireless communication is not possible, communication is not started. Also, in a state in which the proximity wireless communication units are in the proximity wireless communicable range and a communication connection is established, when the proximity wireless communication units are separated from each other by a distance at which the proximity wireless communication is not possible, the communication connection is cancelled. Note that the contactless proximity communication realized by the proximity wireless communication unit 113 is not limited to the NFC, and another wireless communication standard may be adopted. For example, the contactless proximity communication that conforms to the ISO/IEC 14443 may be adopted as the contactless proximity communication realized by the proximity wireless communication unit 113, for example.

In the present embodiment, the communication speed realized by the communication unit 111 is faster than the communication speed realized by the proximity wireless communication unit 113. Also, the range of communication realized by the communication unit 111 is larger than that realized by the proximity wireless communication unit 113. On the other hand, because the communication partner can be limited according to the narrow communicable range of the communication performed by the proximity wireless communication unit 113, processing such as the exchange of an encryption key that needs to be performed in the communication realized by the communication unit 111 is not necessary. That is, easier communication than communication using the communication unit 111 can be realized.

Note that the communication unit 111 of the digital camera 100 in the present embodiment has an AP mode in which the communication unit 111 operates as an access point in an infrastructure mode, and a CL mode in which the communication unit 111 operates as a client in the infrastructure mode. As a result of causing the communication unit 111 to operate in the CL mode, the digital camera 100 in the present embodiment can operate as a CL device in the infrastructure mode. In the case where the digital camera 100 operates as the CL device, as a result of connecting to a nearby AP device, the digital camera 100 can join the network formed by the AP device. Also, as a result of causing the communication unit 111 to operate in the AP mode, the digital camera 100 in the present embodiment can also operate as a simplified AP, which is a type of AP, and has limited functionality. When the digital camera 100 operates as the simplified AP, the digital camera 100 forms a network on its own. An apparatus that is in the vicinity of the digital camera 100 can recognize the digital camera 100 as the AP device, and join the network formed by the digital camera 100. The program for causing the digital camera 100 to operate as described above is stored in the nonvolatile memory 103.

Note that the digital camera 100 in the present embodiment, although being a type of AP, is a simplified AP that does not have a gateway function of transferring data received from a CL device to an internet provider or the like. Accordingly, the digital camera 100, even if it receives data from another apparatus that has joined the network formed by the digital camera 100, cannot transfer the data to a network such as the Internet.

Figure 1B:
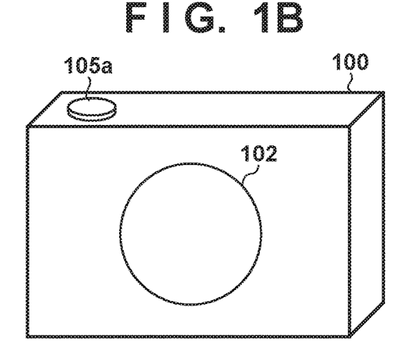
FIGS. 1B and 1C are diagrams illustrating an exemplary external appearance of the digital camera 100.
Figure 1C:
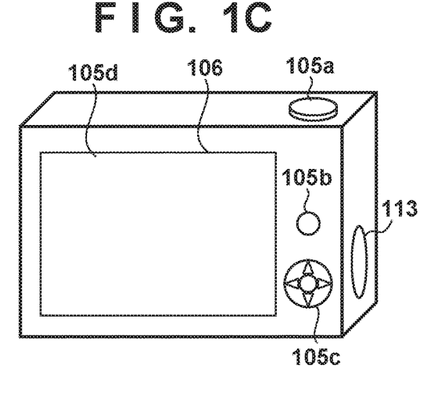

Next, an external appearance of the digital camera 100 will be described. FIGS. 1B and 1C are diagrams illustrating an exemplary external appearance of the digital camera 100. A release switch 105*a*, a playback button 105*b*, a direction keypad 105*c*, and a touch panel 105*d* are operation members that are included in the above-mentioned operation unit 105. Also, an image that has been obtained as a result of capturing performed by the image capturing unit 102 is displayed in the display unit 106. Also, the digital camera 100 of the present embodiment includes an antenna portion of the proximity wireless communication unit 113 at a side face of the camera case. As a result of the proximity wireless communication unit 113 being brought close to a certain distance to the proximity wireless communication unit of another device, the proximity wireless communication with the other device can be established. Accordingly, contactless communication without using a cable or the like is enabled, and the communication partner can be limited as intended by a user.

Outline of Connection Mode

A use case is conceivable in which an image shot by the digital camera 100 is desired to be transferred to an external apparatus. In the present embodiment, an example is shown in which an image is transferred from the digital camera 100 to an FTP server using FTP (File Transfer Protocol). FTP is one type of communication protocol for transferring a file in a network.

Figure 2:
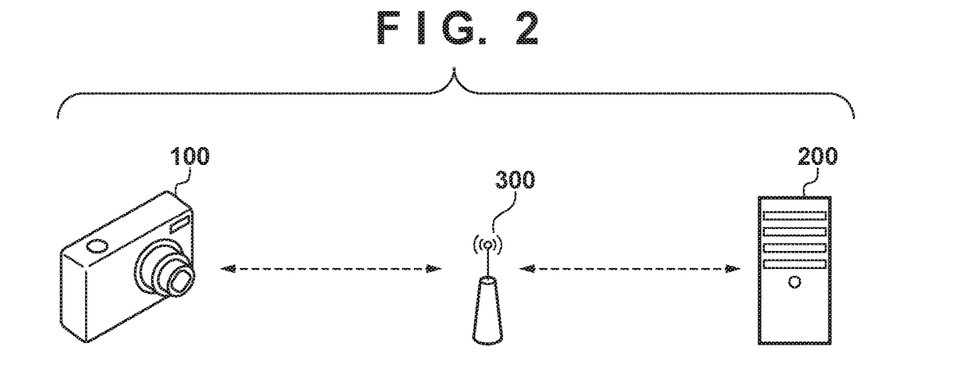
FIG. 2 is a diagram schematically illustrating a connection mode between the digital camera 100 and an FTP server 200.

FIG. 2 is a diagram schematically illustrating a connection mode between the digital camera 100 and an FTP server 200, in the present embodiment. The digital camera 100 and the FTP server 200 join a wireless LAN network formed by an external access point 300, which is an example of an external relay apparatus. As a result of the digital camera 100 connecting to the network while designating the FTP server 200, an FTP connection with the FTP server 200 is enabled. Note that an example in which the digital camera 100 and the FTP server 200 are connected using a wireless LAN network is shown in FIG. 2, but the digital camera 100 and the FTP server 200 can be connected via a wired LAN. After the FTP connection is completed, the user can transfer an image to the FTP server 200 by instructing, in the digital camera 100, to start transfer after designating the image to be transferred. Also, the digital camera 100 includes, not only a function of transferring a designated image, but also a function of automatically transferring a shot image when shooting is performed, a function of, as a result of the user pressing down a determination button when an image is played back, transferring only this image.

In the present embodiment, an example in which FTP is used as a communication protocol used by the digital camera 100 is illustrated, but the communication protocol is not limited thereto. For example, other than the FTP, another communication protocol such as PTP (Picture Transfer Protocol) or HTTP (Hyper Text Transfer Protocol) can be used.

Mechanism of Connection to FTP Server and Image Transfer

Figure 3:
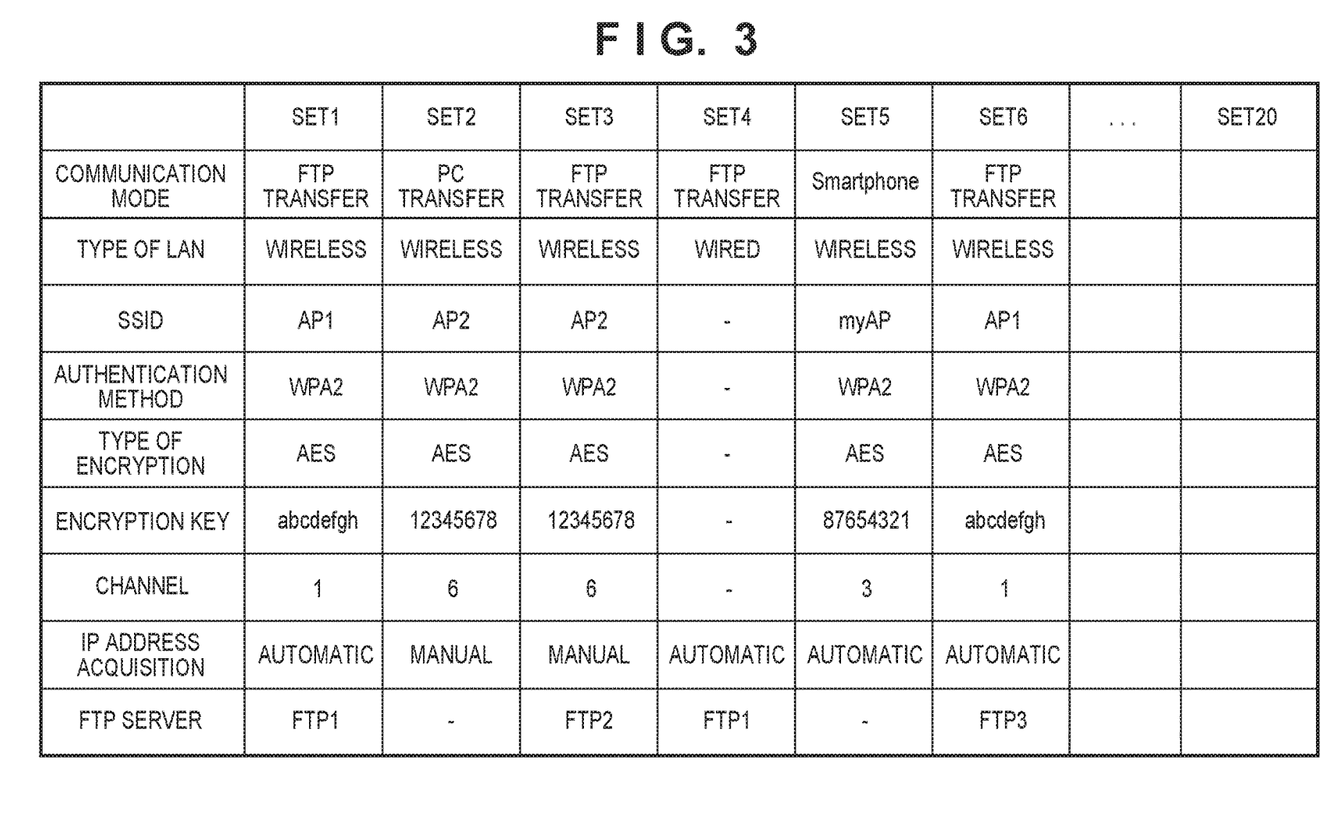
FIG. 3 is a diagram illustrating an example of connection information.

Next, a processing flow for connecting the digital camera 100 to the FTP server 200 will be described using FIGS. 3 and 4A. FIG. 3 is a diagram illustrating an example of connection information stored in the nonvolatile memory 103. In the present embodiment, twenty pieces of connection information from SET1 to SET20 can be stored. A communication mode, a type of LAN, an SSID, an authentication method, a type of encryption, an encryption key, a channel, an IP address acquisition method, an FTP server, and the like are included in the connection information.

An FTP transfer, a PC transfer, a Smartphone, an HTTP server, and the like are types of the "communication mode", and the communication mode indicates which of the communication modes is used to connect to an external apparatus. The "type of LAN" indicates whether the LAN is a wireless LAN or a wired LAN. The "FTP server" includes identification information (such as an IP address or URL) regarding the FTP server.

The digital camera 100 stores connection information such as that shown in FIG. 3 when connected to an external apparatus for the first time, and uses the connection information for connecting to the external apparatus for the second time and thereafter, and as a result, the digital camera 100 can easily connect to the same (corresponding) external apparatus. In the present embodiment, the digital camera 100 includes the connection information such as that shown in FIG. 3, in advance.

Figure 4A:
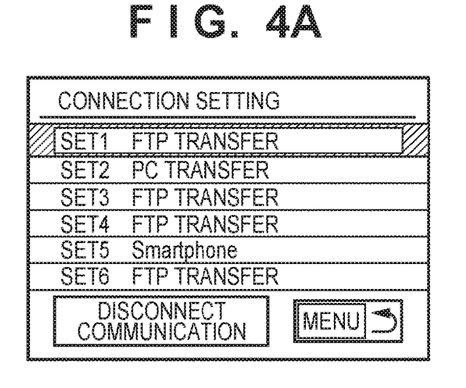
FIG. 4A is a diagram illustrating an exemplary screen of a connection setting list.

FIG. 4A is a diagram illustrating an exemplary screen of a connection setting list for prompting a user to select which SET of the connection information is to be used when the digital camera 100 connects to an external apparatus using the connection information shown in FIG. 3. The user selects a desired connection destination from the SETs displayed in the list, and as a result, the digital camera 100 can be connected to a connection destination of the selected SET.

For example, the user is assumed to have selected SET1. In this case, the digital camera 100 refers to the information of SET1 of the connection information shown in FIG. 3, and performs control so as to connect to an access point having the SSID of AP1, with the wireless LAN using the setting in which the authentication method is WPA2, the type of encryption is AES, and the encryption key is abcdefgh. After the connection with the access point AP1 is completed, an IP address is automatically assigned to the digital camera 100 by DHCP. Thereafter, the digital camera 100 performs control so as to connect to an FTP server, which is FTP1, and the FTP connection is completed. When the FTP connection is completed, the user can select an image in the digital camera 100, and transfer the image to the FTP server, which is FTP1.

As described above, the digital camera 100 stores the connection information, and a user can connect the digital camera 100 to a desired external apparatus by selecting a desired connection destination from the list of connection information.

As described above, the digital camera 100 can transfer a shot image to an FTP server using the FTP transfer. A case is conceivable where the image transfer fails while transferring the image. A case where the connection is disconnected due to the wireless environment deteriorating and the like is conceivable as an example of a failure in the image transfer, for example. There is a mechanism in which, when image-transfer fails, the digital camera 100 automatically re-transfers the transfer-failed image, when the digital camera 100 again connects to an FTP server. However, the FTP server that is the destination of re-connection is not necessarily the FTP server to which the digital camera 100 was connected when the image-transfer failed. Therefore, it is possible that, if an automatic re-transfer of the transfer-failed image is unconditionally executed when the digital camera 100 is again connected to an FTP server, the image may be automatically transferred to an FTP server that is not intended by the user.

In order to suppress the occurrence of such a problem, the digital camera 100 of the present embodiment performs control (recording control) such that information (transfer failure information) in which the transfer-failed image is associated with the FTP server that is the transfer destination is stored. Also, the digital camera 100 performs control (transfer control) such that whether or not an automatic transfer of the transfer-failed image is to be executed is determined based on the transfer failure information, when the digital camera 100 has re-connected to the FTP server. Hereinafter, such an operation of the digital camera 100 will be described in detail using FIGS. 4B to 4D, 5A, 5B, and 6.

Figure 5A:
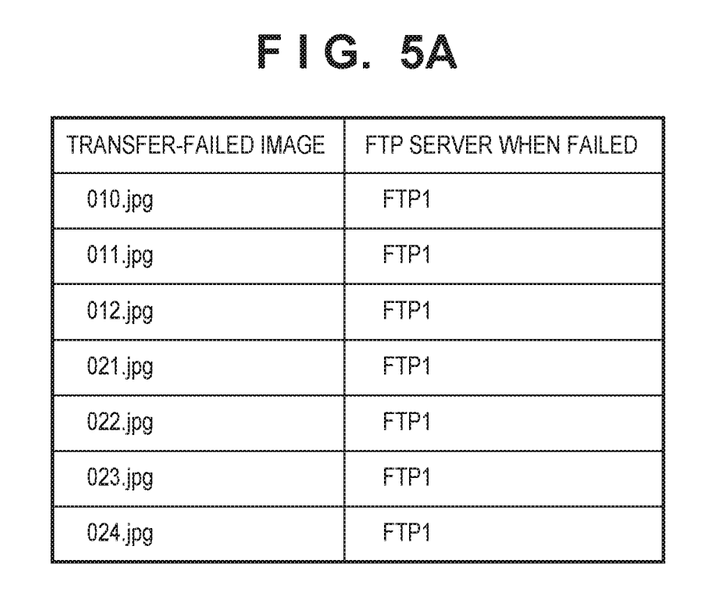
FIGS. 5A and 5B are diagrams illustrating a transfer-failed image list (transfer failure information) in which images that failed to be transferred are associated with FTP servers to which connection was established when the transfer failed.
Figure 5B:
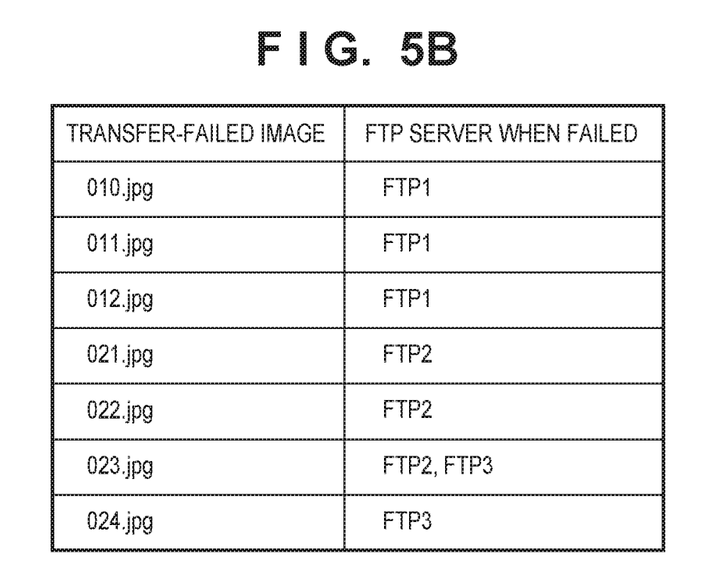

FIGS. 5A and 5B are diagrams illustrating a transfer-failed image list (transfer failure information) in which images that failed to be transferred are associated with FTP servers to which connection was established when the transfer failed. As shown in FIGS. 5A and 5B, the digital camera 100 stores the information in which transfer-failed images are associated with FTP servers to which the digital camera 100 was connected when the transfer failed, in the nonvolatile memory 103. In the present embodiment, the transfer-failed image list shown in FIGS. 5A and 5B is stored. As will be described in detail later, the digital camera 100 starts automatic re-transfer of an image if the FTP server when the transfer failed matches the FTP server that is the re-connection destination, with reference to the transfer-failed image list.

Figure 6:
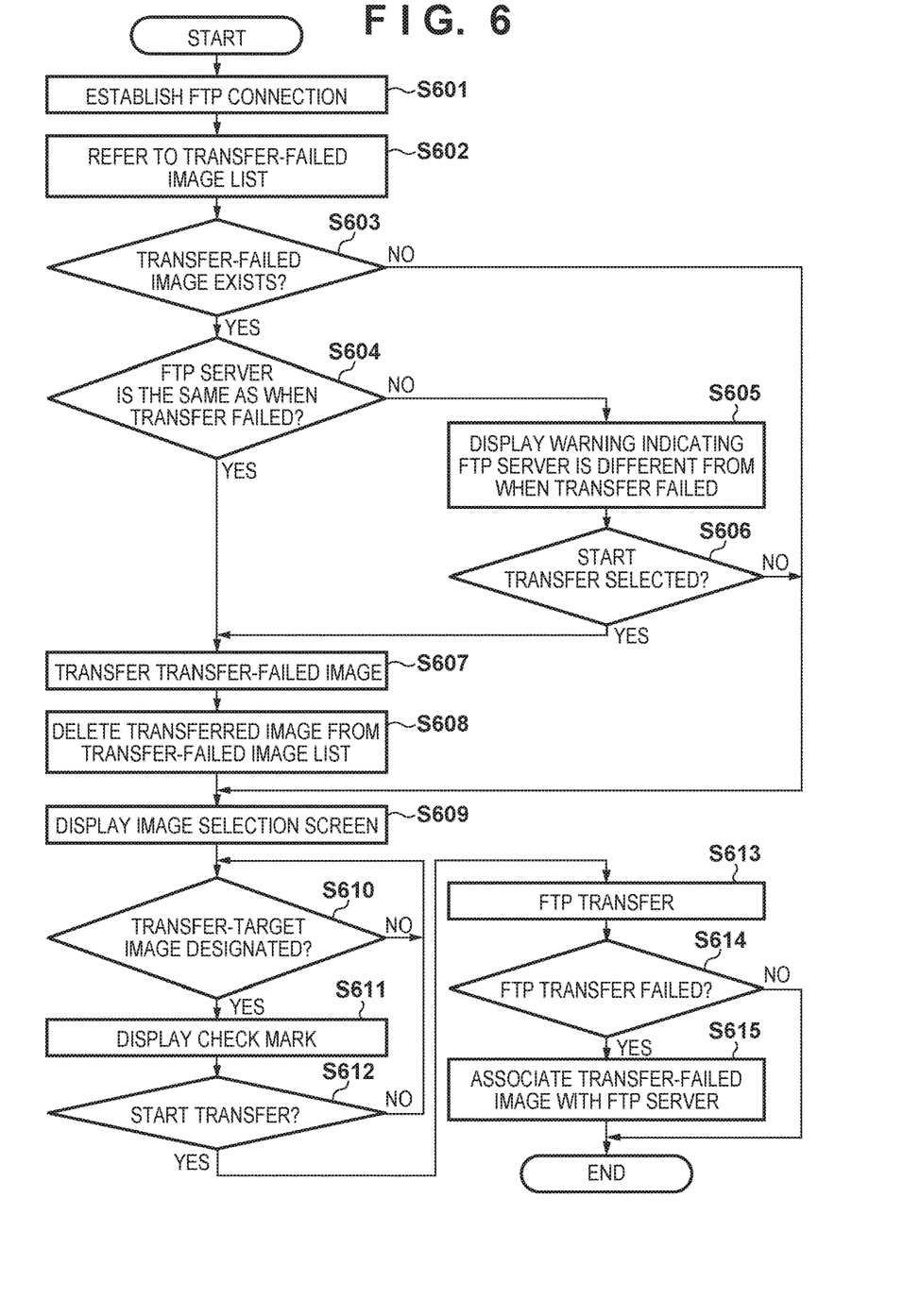
FIG. 6 is a flowchart illustrating FTP transfer processing to be executed by the digital camera 100.

FIG. 6 is a flowchart illustrating the FTP transfer processing to be executed by the digital camera 100. The processing in each step of the flowchart is realized by the control unit 101 loading a program stored in the nonvolatile memory 103 to the work memory 104 and executing it, unless otherwise specified. When a user selects a piece of connection information (SET1, for example) that is associated with an FTP server in the screen shown in FIG. 4A, the processing of this flowchart is started.

In step S601, the control unit 101 establishes a connection with the FTP server via the communication unit 111. In the present embodiment, the control unit 101 is assumed to establish the connection using the connection information SET1 shown in FIG. 3. That is, the digital camera 100 connects to an FTP server FTP1 via an access point AP1.

In step S602, the control unit 101 loads the transfer-failed image list stored in the nonvolatile memory 103 to the work memory 104, and refers to the transfer-failed image list.

In step S603, the control unit 101 determines whether or not a transfer-failed image exists in the transfer-failed image list that was referred to in step S602. If a transfer-failed image exists, the processing advances to step S604, and if a transfer-failed image does not exist, the processing advances to step S609. At first, the processing advances to step S609, because there is no transfer-failed image. The processing (steps S604 to S608) in the case where a transfer-failed image exists will be described later.

In step S609, the control unit 101 displays an image selection screen (unshown) in the display unit 106. In step S610, the control unit 101 determines whether or not the user operated the operation unit 105 and designated a transfer target image. If a transfer target image was designated, the processing advances to step S611, and if a transfer target image was not designated, the processing returns to step S610. In the image selection screen, images stored in the recording medium 110 are displayed in a thumbnail view, and the user can designate a transfer target image by selecting a thumbnail image using the operation unit 105. According to this user operation, the control unit 101 determines the designated image as the transfer target.

In step S611, the control unit 101 displays a check mark in the vicinity of the thumbnail image of the transfer target image designated in step S610. In this way, the user can easily recognize the transfer target image.

In step S612, the control unit 101 determines whether or not the user operated the operation unit 105 and made an instruction to start transfer of the transfer target image. If an instruction to start transfer was made, the processing advances to step S613, and if an instruction to start transfer was not made, the processing returns to step S610.

In step S613, the control unit 101 transfers the transfer target image designated in step S610 to the FTP server FTP1 via the communication unit 111.

In step S614, the control unit 101 determines whether or not the transfer of the transfer target image failed in step S613. If the transfer failed, the processing advances to step S615, and if the transfer did not fail, the processing of this flowchart is ended. Here, the transfer of at least one transfer target image is assumed to have failed. A case where the connection is disconnected because the wireless environment deteriorated, and as a result, transfer is no longer possible is an example in which the transfer fails.

In step S615, the control unit 101 stores the transfer-failed image list, as shown in FIG. 5A, in which the transfer-failed images are associated with an FTP server (FTP1, in this case) to which the digital camera 100 was connected when the transfer failed, to the work memory 104 and the nonvolatile memory 103.

Next, the processing in the case where, after the image-transfer failed, the communication unit 111 again connects to the same FTP server as that when the transfer failed will be described. Here, the digital camera 100 is assumed to store the transfer-failed image list shown in FIG. 5A. Also, the user is assumed to select, when the FTP connection is performed after the image-transfer failure, the connection information SET1 shown in FIG. 3, similarly to when the transfer fails. The processing in steps S601 to S603 is similar to the above-mentioned processing performed when no transfer-failed image exists. However, it is determined that a transfer-failed image exists in step S603 this time, and as a result, the processing advances from step S603 to step S604.

In step S604, the control unit 101 determines whether or not the currently connected FTP server is the same as that when the image-transfer failed. In step S604, if the currently connected FTP server is the same as that when the image-transfer failed, the processing advances to step S607, and if the currently connected FTP server is different from that when the image-transfer failed, the processing advances to step S605. Here, as shown in the transfer-failed image list in FIG. 5A, the FTP server when the image-transfer failed is the FTP1, and the currently connected FTP server is also the FTP1, and as a result, the processing advances to step S607. The processing (steps S605 to S606) when the currently connected FTP server is different from that when the image-transfer failed will be described later.

Here, when the determination as to whether or not the currently connected FTP server is the same as that when the image-transfer failed is performed, differences of the access point (SSID) or the like is not taken into consideration. For example, a case is considered where connection is again made using SET information that is different from that when the transfer failed (SET1 and SET4, for example), in the connection information shown in FIG. 3. In this case as well, if the FTP server is the same, the control unit 101 determines that the currently connected FTP server is the same as that when the image-transfer failed.

In step S607, the control unit 101 transfers the transfer-failed image to the FTP server FTP1 via the communication unit 111. In the example shown in FIG. 5A, the control unit 101 automatically transfers the transfer-failed images having file names "010.jpg", "011.jpg", "012.jpg", "021.jpg", "022.jpg", "023. jpg", and "024.jpg" to FTP1.

In step S608, the control unit 101 deletes the images that were transferred in step S607 from the transfer-failed image list stored in the work memory 104, and stores the updated transfer-failed image list to the nonvolatile memory 103. The processing thereafter (the processing in step S609 and onward) is the same as when no transfer-failed image exists.

Next, the processing when the communication unit 111 has connected, after the image-transfer failed, to a different FTP server from that when the transfer failed will be described. Here, the digital camera 100 is assumed to store the transfer-failed image list shown in FIG. 5A. Also, when the FTP connection is made after the image-transfer failed, the user is assumed to select the connection information SET3 shown in FIG. 3 that is different from that when the transfer failed. The processing in steps S601 to S604 is the same as that in the case where, after the transfer failed, the communication unit 111 is connected to the same FTP server as that when the transfer failed. However, this time, the currently connected FTP server (FTP2) is determined to be different from that (FTP1) when the image-transfer failed in step S604, and therefore the processing advances from step S604 to step S605.

Figure 4B:
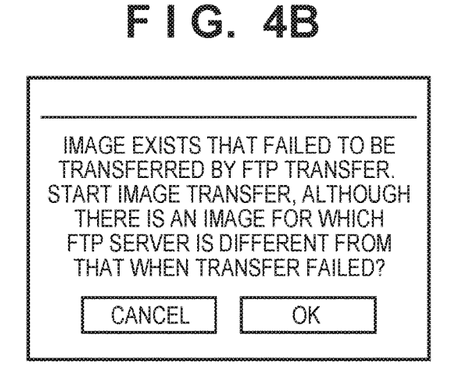
FIG. 4B is a diagram illustrating an exemplary warning screen when connected to an FTP server that is different from the FTP server to which an image failed to be transferred.

In step S605, the control unit 101 notifies the user of the currently connected FTP server being different from that when the image-transfer failed (that is, the communication unit 111 is connected to an FTP server that is not associated with the images included in the transfer-failed image list). This notification is performed by displaying a warning screen in the display unit 106, for example. An exemplary warning screen when the digital camera 100 is connected to an FTP server that is different from that when the image-transfer failed is shown in FIG. 4B. As shown in FIG. 4B, the warning screen includes a user interface for allowing the user to select whether or not the transfer of transfer-images is to be started although the FTP server is different.

Here, the display of the warning screen is not performed for each image, and is assumed to be performed once for the connected FTP server. For example, a case where the transfer-failed image list is as shown in FIG. 5B is considered. In this example, a plurality of FTP servers (FTP1, FTP2, and FTP3) exist to which the digital camera 100 was connected when the transfer failed. When the communication unit 111 connects to the FTP1 in this state, although a plurality of images exist that failed to be transferred to the FTP2 or FTP3, the warning display is performed once after the connection with the FTP1 is established. Also, in this example, "010.jpg", "011.jpg", and "012.jpg" of the seven images included in the transfer-failed image list are associated with the FTP server that is the same as the currently connected FTP server. In this case, the control unit 101 may automatically transfer the images associated with the currently connected FTP server from the plurality of images included in the transfer-failed image list to the FTP server. Alternatively, the control unit 101 may perform control such that all of the images included in the transfer-failed image list are not automatically transferred to the FTP server.

Returning to FIG. 6, in step S606, the control unit 101 determines whether or not the user selected the instruction to start transfer, using the operation unit 105, in the warning screen. If the user selected the instruction to start transfer, the processing advances to step S607. In this case, the processing in step S607 and onward is the same as the case where, after the transfer failed, the communication unit 111 again connects to the same FTP server as that when the transfer failed, excluding the fact that the FTP server to which the images are to be transferred is different. If the user selected the instruction to not start transfer in step S606, the processing advances to step S609. In this case, although the transfer-failed images in step S607 are not transferred, the processing in step S609 and onward is the same as the case where, after the transfer failed, the communication unit 111 again connects to the same FTP server as that when the transfer failed, as described above.

Modifications in Step S605 and S606

The digital camera 100 may be configured such that, in the case where, after the image-transfer failed, the communication unit 111 connects to a different FTP server from that when the transfer failed, the user is allowed to select whether the connection is to be switched to another FTP server.

Figure 4C:
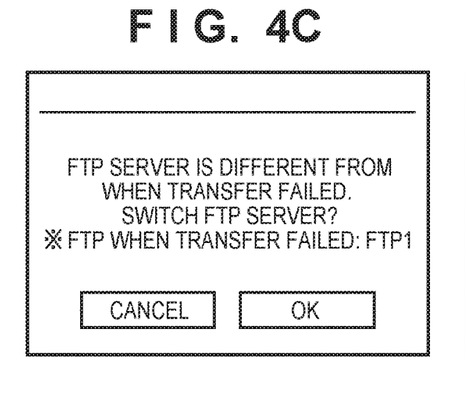
FIG. 4C is a diagram illustrating an exemplary selection screen to determine whether or not an FTP server is to be switched.
Figure 4D:
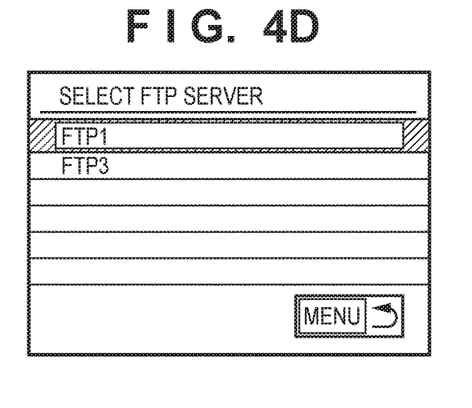
FIG. 4D is a diagram illustrating an exemplary selection screen for selecting a switching destination FTP server.

For example, a case is considered in which, in a state in which transfer-failed images exist as shown in the transfer-failed image list in FIG. 5A, the digital camera 100 is connected to the FTP server FTP2 using the connection information SET3 in FIG. 3. In this case, the control unit 101, subsequent to the processing in step S604 in FIG. 6, displays a selection screen (user interface), in the display unit 106, for selecting whether or not the FTP server will be switched, as shown in FIG. 4C. Also, the control unit 101 displays, in the selection screen shown in FIG. 4C, the FTP server name so that the user can be aware of the FTP server at the time when the image-transfer failed. The user selects whether or not the FTP server will be switched. If the user selects "OK", the control unit 101 displays a selection screen (user interface), in the display unit 106, in which the switching destination-candidate FTP servers are shown, as shown in FIG. 4D. The FTP servers shown in the selection screen in FIG. 4D are the FTP servers stored in the connection information in FIG. 3, excluding the currently connected FTP server. If the user selects FTP1, the control unit 101 causes the communication unit 111 to connect to FTP1. In this case, because the digital camera 100 is connected to the same FTP server as that when the image-transfer failed, the control unit 101 starts transferring the transfer-failed images. That is, the control unit 101 executes the processing in step S607 and onward in FIG. 6. If the user selects FTP3 instead of the FTP server FTP1 when the transfer failed in the selection screen shown in FIG. 4D, the control unit 101 may further display a warning screen such that the user is allowed to select whether or not transfer of the transfer-failed images is started. Alternatively, the control unit 101 may start transfer to FTP3 while respecting the user's intention regarding the selection.

If the user selects "Cancel" in the selection screen in FIG. 4C, the control unit 101 will not switch the FTP server. In this case, the control unit 101 displays the above-mentioned warning screen shown in FIG. 4B in the display unit 106. In this case, the control unit 101 executes the processing in step S605 and onward in FIG. 6. Alternatively, the digital camera 100 may be configured so as to not transfer the transfer-failed image, if the user selects "Cancel" in the selection screen in FIG. 4C.

Change or Deletion of FTP Server

Next, a case where the user changes or deletes an FTP server included in the connection information will be described. The digital camera 100 stores the connection information shown in FIG. 3, and items in the connection information can be changed or deleted afterward. When the digital camera 100 changes the connection information, the connection destination FTP server can also be changed. However, it is possible that, when an FTP server is changed or deleted, the FTP server may have been changed or deleted without the user noticing that a transfer-failed image exists. As a result, there is a risk that the user cannot transfer the transfer-failed image to the FTP server originally intended by the user. Therefore, in the case where a transfer-failed image exists when the FTP server is changed or deleted, the digital camera 100 notifies the user of the existence of the transfer-failed image by displaying a warning screen.

Figure 7:
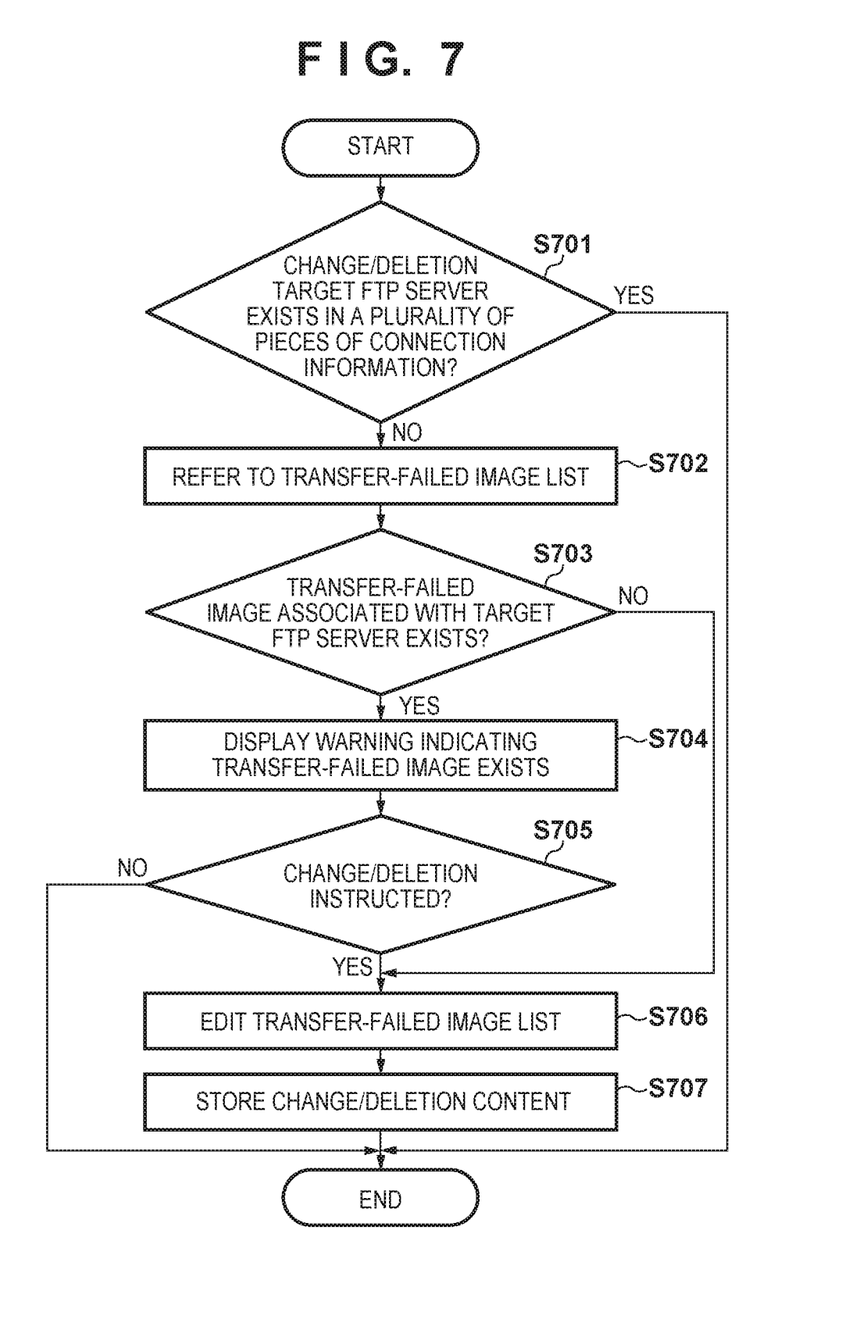
FIG. 7 is a flowchart of warning processing that is to be executed by the digital camera 100 when the FTP server is changed or deleted.

FIG. 7 is a flowchart of warning processing when an FTP server is changed or deleted that is to be executed by the digital camera 100. The processing in each step of the flowchart is realized by the control unit 101 loading a program stored in the nonvolatile memory 103 to the work memory 104 and executing it, unless otherwise specified.

The processing in this flowchart is started when the user has instructed that the FTP server is to be deleted or changed via an unshown user interface.

In step S701, the control unit 101 determines whether or not the change or deletion-target FTP server exists in a plurality of pieces of connection information. If the change or deletion-target FTP server exists in a plurality of pieces of connection information, an SET including this FTP server still remains in the connection information even after the change or deletion is performed. Therefore, because there is no need of warning, the processing of this flowchart is ended. However, the digital camera 100 may be configured such that a warning is performed even in a case where the target FTP server exists in a plurality pieces of connection information. If the change or deletion-target FTP server does not exist in a plurality of pieces of connection information, the processing advances to step S702. In the following description, the user is assumed to have instructed a change or deletion of FTP1 in a situation in which FTP1 is included in only one piece of connection information.

In step S702, the control unit 101 loads the transfer-failed image list stored in the nonvolatile memory 103 to the work memory 104, and refers to the transfer-failed image list. Here, the transfer-failed image list shown in FIG. 5A is assumed to be loaded to the work memory 104.

In step S703, the control unit 101 determines whether or not a transfer-failed image that is associated with the change or deletion target FTP server exists based on the transfer-failed image list referred to in step S702. If a transfer-failed image associated with the target FTP server exists, the processing advances to step S704, and if not, the processing advances to step S706. Here, because the target FTP server is FTP1 and FTP1 is included in the transfer-failed image list shown in FIG. 5A, the processing advances to step S704.

Figure 4E:
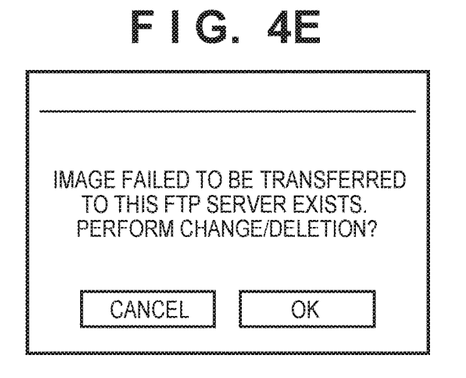
FIG. 4E is a diagram illustrating an exemplary warning screen that is displayed in the case where a transfer-failed image that is associated with the change/deletion target FTP server exists.

In step S704, the control unit 101 displays, in the display unit 106, a warning for notifying that a transfer-failed image associated with the target FTP server exists. FIG. 4E is a diagram illustrating an exemplary warning screen that is displayed in the case where a transfer-failed image that is associated with the change or deletion target FTP server exits. As shown in FIG. 4E, in the warning screen, the user can select whether or not the FTP server is to be changed or deleted.

In step S705, the control unit 101 determines whether or not the user has selected, in the warning screen shown in FIG. 4E, to change or delete the FTP server, using the operation unit 105. If the change or deletion of the FTP server is instructed (that is, if the OK button is selected), the processing advances to step S706, and if the change or deletion of the FTP server is cancelled (that is, the cancel button is selected), the processing of this flowchart is ended.

In step S706, the control unit 101 edits the transfer-failed image list stored in the nonvolatile memory 103. For example, if the deletion of FTP1 is instructed, the control unit 101 deletes an image associated with FTP1 from the transfer-failed image list. That is, in the case where the digital camera 100 stores the transfer-failed image list shown in FIG. 5A, the control unit 101 deletes all the images stored in the transfer-failed image list. Also, in the case where the digital camera 100 stores the transfer-failed image list shown in FIG. 5B, for example, the control unit 101 deletes "010.jpg", "011.jpg", and "012.jpg" from the transfer-failed image list. Also, when an instruction is made to change the FTP1, the control unit 101 edits the FTP server when the transfer failed that is included in the transfer-failed image list. For example, in the case where FTP1 is changed to FTP4 in the connection information, the control unit 101 changes FTP1 included in the transfer-failed image list to FTP4.

In step S707, the control unit 101 reflects the content of the changed or deleted FTP server in the connection information, and stores the updated connection information in the nonvolatile memory 103. As a result, the identification information in "FTP server" of SET1 shown in FIG. 3 is changed from the identification information indicating FTP1 to the identification information indicating FTP4, for example.

As described above, according to the first embodiment, the digital camera 100 stores, when the image-transfer to an FTP server has failed, the transfer-failed image list in which this image is associated with the transfer-destination FTP server. Thereafter, when the connection with an FTP server is established, if an image included in the transfer-failed image list is associated with the current FTP server, the digital camera 100 automatically transfers this image to the current FTP server.

Accordingly, a data item that failed to be transferred to an external apparatus, can be easily transferred to the external apparatus that is highly likely to be the one intended by a user.

Also, the digital camera 100, in the case where the current FTP server is different from the FTP server when the transfer failed, displays a warning for notifying the user of the fact, and allows the user to select whether or not the transfer is to be started. Note that the digital camera 100 may be configured such that the user can set whether or not a warning is displayed in the case where the current FTP server is different from the FTP server when the transfer failed. In the case where the digital camera 100 is set so as to not display the warning, the digital camera 100 automatically transfers the transfer-failed image to the current FTP server, even in a case where the current FTP server is different from the FTP server when the transfer failed. That is, in this case, the determination in step S604 in FIG. 6 is omitted, and the control unit 101, upon determining that a transfer-failed image exists in step S603, advances the processing from step S603 to step S607. As a result of the digital camera 100 being configured in this way, if the user desires to re-transfer the transfer-failed image to whichever FTP server, the transfer-failed image can be re-transferred without the time and effort involved in selecting whether or not the transfer is to be started when connected to an FTP server. Alternatively, the digital camera 100 may be configured such that, in the case of being set so as to not display the warning, the transfer-failed image will not be transferred. In this case, the processing in steps S605 and S606 in FIG. 6 is omitted, and the control unit 101, if determining, in step S604, that the current FTP server is different from the FTP server when the transfer failed, advances the processing from S604 to step S609. As a result of the digital camera 100 being configured in this way, the transfer of a transfer-failed image can be started, only when the warning screen is displayed, even if the FTP server is different, and the transfer-failed image can be prevented from being automatically re-transferred to an unintended FTP server.

Also, the digital camera 100 may, if the current FTP server is different from the FTP server when the transfer failed, allow the user to select whether or not the FTP server will be switched. Accordingly, the transfer-failed image can be transferred to the FTP server intended by the user.

Furthermore, in the case where change or deletion of the FTP server included in the connection information is instructed, if the target FTP server is not included in a plurality of pieces of connection information and a transfer-failed image associated with the target FTP server exists, the digital camera 100 displays a warning. Accordingly, the user is notified of the existence of a transfer-failed image that is associated with the target FTP server, and is allowed to select whether or not the change or deletion will be performed in spite of this fact.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-029231, filed Feb. 20, 2017, which is hereby incorporated by reference herein in its entirety.

What is claimed is:

1. A communication apparatus comprising a processor and a memory storing a program which, when executed by the processor, causes the communication apparatus to function as:
a communication control unit configured to control a communication unit so as to connect to one of a plurality of external apparatuses;
a transfer unit configured to transfer a data item to an external apparatus to which the communication unit has connected;
a storage control unit configured to, in a case that a transfer of the data item to the external apparatus to which the communication unit has connected is failed, store transfer failure information in which the data item is associated with the external apparatus to which the communication unit has connected, in a storage unit; and
a transfer control unit configured to control, in a case that the communication unit has connected to a first external apparatus after a transfer of a data item by the transfer unit is failed, a transfer of a data item included in the transfer failure information,
wherein the transfer control unit performs control so as to, if a data item included in the transfer failure information is associated with the first external apparatus, automatically transfer the data item to the first external apparatus.

2. The communication apparatus according to claim 1, wherein the transfer control unit is configured to perform control to, if a data item included in the transfer failure information is not associated with the first external apparatus, notify a user of the communication unit having connected to an external apparatus that is not associated with a data item included in the transfer failure information, accept, from the user, an instruction regarding whether or not a data item included in the transfer failure information is to be transferred, and if a transfer of the data item included in the transfer failure information is instructed, transfer the data item to the first external apparatus.

3. The communication apparatus according to claim 2, further comprising a setting unit configured to set whether or not the transfer control unit performs the notification, wherein the transfer control unit is configured to perform control to, if the transfer control unit is set so as to not perform the notification, automatically transfer the data item included in the transfer failure information to the first external apparatus, regardless of whether or not the data item is associated with the first external apparatus.

4. The communication apparatus according to claim 2, further comprising a setting unit configured to set whether or not the transfer control unit performs the notification, wherein the transfer control unit is configured to perform control to, if the transfer control unit is set so as to not perform the notification, not automatically transfer the data item included in the transfer failure information to the first external apparatus, if the data item is not associated with the first external apparatus.

5. The communication apparatus according to claim 1, wherein the transfer control unit is configured to perform control to, if a data item included in the transfer failure information is not associated with the first external apparatus, display a user interface, on a display unit, for selecting a connection-destination external apparatus, and the communication control unit is configured to control the communication unit so as to connect to a second external apparatus selected in the user interface.

6. The communication apparatus according to claim 5, wherein the transfer control unit is configured to perform control to, in a case where the communication unit has connected to the second external apparatus according to the selection performed in the user interface, automatically transfer the data item included in the transfer failure information to the second external apparatus, regardless of whether or not the data item is associated with the second external apparatus.

7. The communication apparatus according to claim 5, wherein the transfer control unit is configured to perform control to, if the data item included in the transfer failure information is not associated with the first external apparatus, display information indicating an external apparatus with which the data item is associated, on the display unit.

8. The communication apparatus according to claim 1, wherein the storage control unit is configured to perform control to store identification information for each of one or more external apparatuses, in the storage unit, the communication control unit is configured to control the communication unit so as to connect to an external apparatus corresponding to identification information selected from the storage unit, and the storage control unit is configured to perform control to, in a case where a change or deletion of the identification information corresponding to an external apparatus included in the transfer failure information is instructed by a user, notify the user of a data item being included in the transfer failure information, the data item being associated with the external apparatus corresponding to change or deletion target identification information, accept an instruction from the user regarding whether or not the change or deletion of the target identification information will be executed, and if the change or deletion of the target identification information is instructed to be executed, change or delete the target identification information.

9. The communication apparatus according to claim 1, wherein the transfer control unit is configured to perform control to, in a case where a plurality of data items are included in the transfer failure information, automatically transfer the data item, of the plurality of data items, associated with the first external apparatus to the first external apparatus.

10. The communication apparatus according to claim 1, wherein the transfer control unit is configured to perform control to, in a case where a plurality of data items are included in the transfer failure information, not perform automatic transfer with respect to all of the plurality of data items, if at least one of the plurality of data items is not associated with the first external apparatus.

11. An image capturing apparatus comprising: the communication apparatus according to claim 1; and an image capturing unit, wherein the data item is an image generated by the image capturing unit.

12. A control method executed by a communication apparatus, comprising:
controlling a communication unit so as to connect to one of a plurality of external apparatuses;
transferring a data item to an external apparatus to which the communication unit has connected;
in a case that a transfer of the data item to the external apparatus to which the communication unit has connected is failed, storing transfer failure information in which the data item is associated with the external apparatus to which the communication unit has connected, in a storage unit; and
in a case that the communication unit has connected to a first external apparatus after a transfer of a data item by the transfer unit is failed, controlling a transfer of a data item included in the transfer failure information,
wherein if a data item included in the transfer failure information is associated with the first external apparatus, the data item is automatically transferred to the first external apparatus.

13. A non-transitory computer-readable storage medium which stores a program for causing a computer to execute a control method comprising:
controlling a communication unit so as to connect to one of a plurality of external apparatuses;
transferring a data item to an external apparatus to which the communication unit has connected;
in a case that a transfer of the data item to the external apparatus to which the communication unit has connected is failed, storing transfer failure information in which the data item is associated with the external apparatus to which the communication unit has connected, in a storage unit; and
in a case that the communication unit has connected to a first external apparatus after a transfer of a data item by the transfer unit is failed, controlling a transfer of a data item included in the transfer failure information,
wherein if a data item included in the transfer failure information is associated with the first external apparatus, the data item is automatically transferred to the first external apparatus.

* * * * *